United States Patent [19]

Jordening

[11] 4,296,879
[45] Oct. 27, 1981

[54] BIKE CARRYING ADAPTER

[76] Inventor: Harold G. Jordening, 1541 E. La Palma, A-3, Anaheim, Calif. 92805

[21] Appl. No.: 182,477

[22] Filed: Aug. 29, 1980

[51] Int. Cl.³ ................................................ B60R 9/10
[52] U.S. Cl. .......................... 224/42.45 R; 224/42.03 B
[58] Field of Search ................ 224/42.45 R, 42.03 R, 224/42.03 B, 42.29, 917, 320; 414/462; 211/17, 18, 22

[56] References Cited

U.S. PATENT DOCUMENTS

| 3,137,422 | 6/1964 | Wheaton | 224/320 |
| 3,338,485 | 8/1967 | Van Leer, Jr. et al. | 224/42.45 R X |
| 3,847,317 | 11/1974 | Raff et al. | 224/42.03 B |
| 3,921,869 | 11/1975 | Rogers | 224/42.03 B |
| 4,046,273 | 9/1977 | Hughes | 224/42.03 B X |
| 4,050,616 | 9/1977 | Mosow | 414/462 X |

Primary Examiner—Steven M. Pollard

[57] ABSTRACT

The Bike Carrying Adapter permits the carriage of girls' bicycles and small childrens' bicycles on full size bicycle racks designed for mounting on automobile bumpers.

4 Claims, 2 Drawing Figures

BIKE CARRYING ADAPTER

BRIEF SUMMARY OF THE INVENTION

The Bike Carrying Adapter comprises essentially two basic parts; a closed elongated square tube and a smaller elongated channel tube slidably mounted within the elongated square tube. A small chain is fastened to one end of the larger square elongated tube. A snap hook is secured to one end of the chain, which chain is of sufficient length to reach under the rear frame of a bicycle and to reach the free end of the chain and attach to the hook. One end of the smaller elongated channel tube has two right-angle extruded L-Brackets bolted to either side of the channel tube at one end of the tube. To each right-angle extrusion is welded a round cross-section steel J-hook. Parallel to the vertical sides of the tube and disposed with the U-shaped ends of the J-Hooks facing in the same plane but which are towards the other end of the channel tube so as to allow the reception of the handlebars of a bicycle. The entire Bike Carrying Adapter is adapted to fastening to conventional bicycle racks commonly available for automobile bumpers.

DESCRIPTION OF THE PREFERRED EMBODIMENT IN FIGS. I AND II

Figure 1:
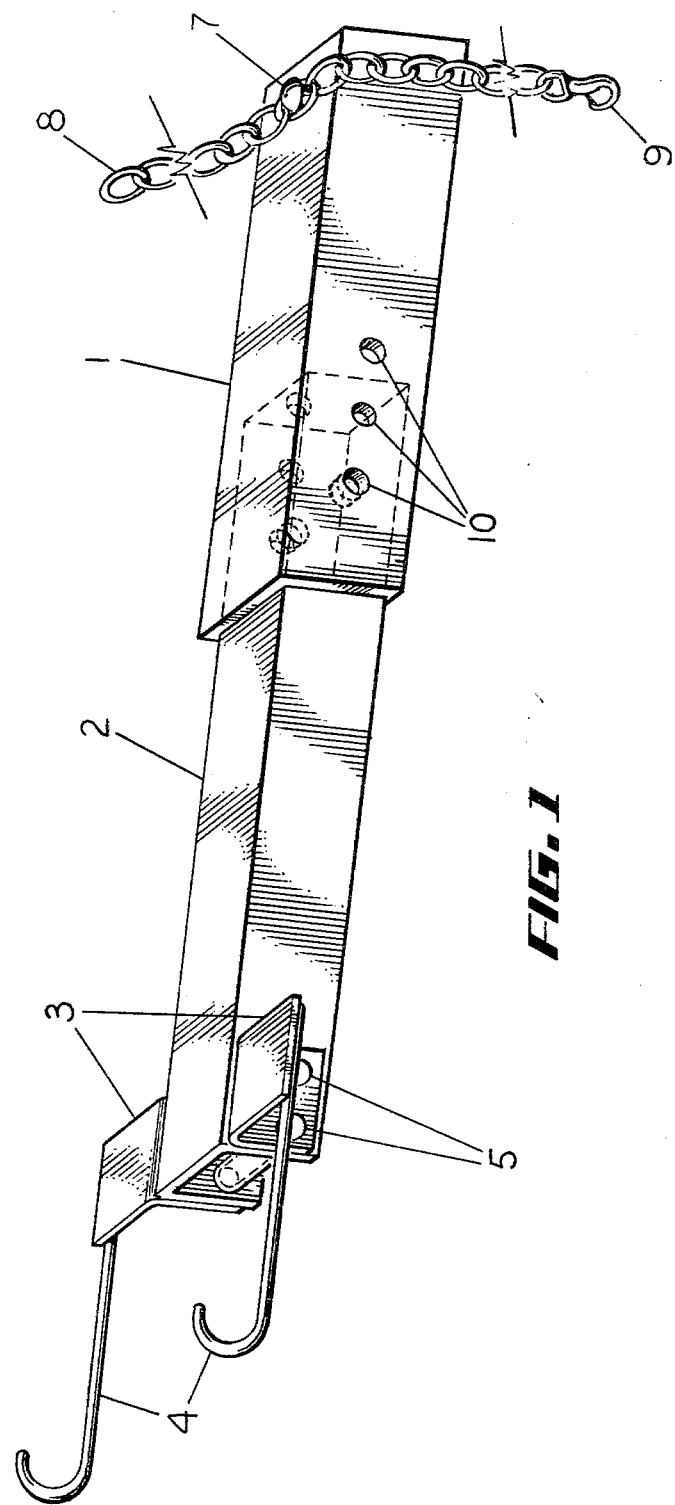
FIG. 1 is a perspective view of the invention itself.
Figure 2:
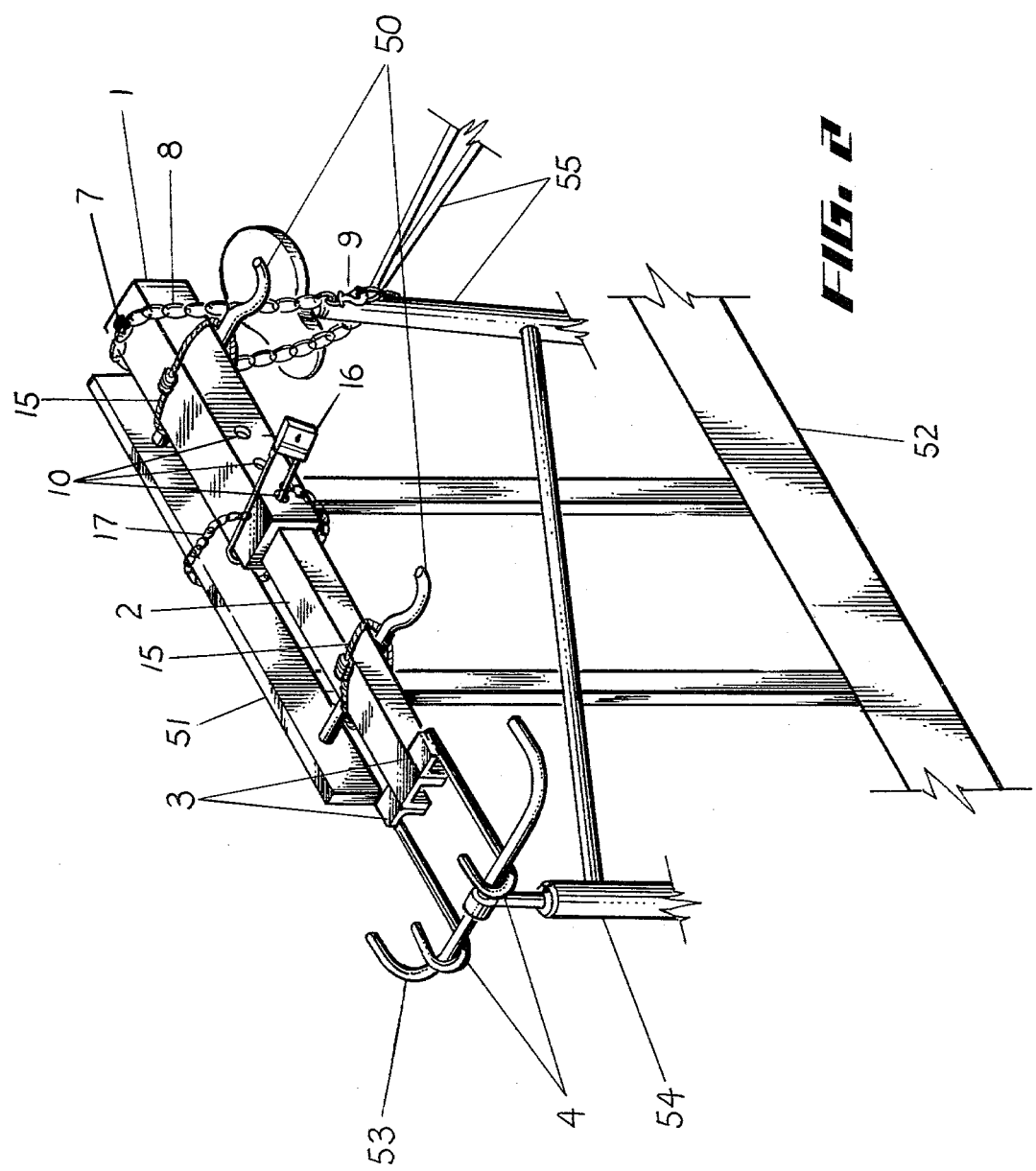
FIG. 2 is a perspective view of the invention carrying a bicycle and mounted on a bicycle rack on an automobile bumper.

Referring to FIGS. I and II, a square elongated tube 1 is of sufficient length to receive an elongated channel tube 2 of smaller external cross-section permitting the combination thereof to be telescopic. Two angle iron extrusions 3 are bolted to 2 at one end by two small bolts 5 which extend through the elongated channel tube 2. The telescopic combination of 1 and 2 permit it to be supported by the carrying hooks 50, of a bicycle rack 51, used on automobile bumpers 52. Two metal J-Hooks 4, are welded to the outermost undersides of angle iron extrusions 3. Each J-Hook 4 lifts in a vertical plane parallel to the sides of the channel tube. The Hooks 4 are adapted to supporting the handlebars 53 of a bicycle 54. Fastened to one end of the square elongated tube 1 is a small chain 8 which is secured to the tube by a bolt 7, and has on one end of the chanin a small snap-hook 9, adapted to engaging link of the chain. The chain, 8, is used to secure the rear of the bicycle by going under the rear frame, 55. Two straps, 15, are adapted to securing the Bike Carrying Adapter to bicycle rack, 51. A plurality of holes, 10, are drilled through both large tube, 1, and small tubes, 2, to allow a lock to be passed through tubes 1 and 2, securing the tube spacing at the desired length. Chain 17 is used to secure the Bike Carrying Adapter to the Bicycle Rack, 51, by wrapping around the upper end of the bicycle rack.

What is claimed is:

1. A device for adapting a vehicle mountable bicycle carrier capable of carrying one size bicycle to permit the carrier to carry bicycles of various sizes comprising:
    (a) an extensible support member,
    (b) means for securing the length of the extensible support member at a selected one of a plurality of selectable lengths,
    (c) means for fastening the extensible support member to a vehicle-mountable bicycle carrier,
    (d) means near the rear end of the extensible support member for supporting the rear portion of a bicycle, and
    (e) means near the front end of the extensible support member for supporting the handle bars of a bicycle, said bicycle handle bar supporting means, comprising a pair of parallel J-hooks fastened to either side of the extensible support member near said front end of the extensible support member, the J-hooks extending outward from said front end of the extensible support member with the long straight portions of the J's parallel to the axis of extensibility of the extensible support member and the U-shaped ends of the J-hooks lying in parallel vertical planes on opposite sides of the extensible support member with the interior portions of the U-shaped ends facing towards the rear end of the extensible support member.

2. The device of claim 1 wherein the extensible support member comprises a hollow outer tube containing a smaller cross-section channel tube slidable along the longitudinal axes of the hollow outer tube and the inner channel tube.

3. The device of claim 2 wherein the hollow outer tube has at least two pairs of coaxial holes through opposite vertical walls of the tube, the pairs of holes being disposed along equal height lines parallel to the longitudinal axis of the outer tube, and the inner channel has at least one pair of coaxial holes through opposite channel tube vertical walls at the same vertical height as the holes in the outer tube, permitting alignment of channel tube holes with a selected pair of outer tube holes and insertion of a locking pin through all 4 holes to secure the length of the extensible member at a desired length.

4. The device of claim 3 wherein the means for supporting the rear end of a bicycle comprises a chain fastened to the hollow outer tube near its open end, both ends of the chain being free and one end of the chain containing a snap hook engageable with the other end of the chain.

* * * * *